US 6,714,126 B2

(12) United States Patent
Wada (10) Patent No.: US 6,714,126 B2
(45) Date of Patent: Mar. 30, 2004

(54) VEHICLE INDICATOR UNIT HAVING WOWING AND GRADUATION LIGHTING FUNCTION (75) Inventor: Toshiki Wada, Kariya (JP)

(73) Assignee: Denso Corporation, Kariya (JP)

( * ) Notice: Subject to any disclaimer, the term of this patent is extended or adjusted under 35 U.S.C. 154(b) by 32 days.

(21) Appl. No.: 10/079,578

(22) Filed: Feb. 22, 2002

(65) Prior Publication Data
US 2002/0140552 A1 Oct. 3, 2002

(30) Foreign Application Priority Data
Mar. 30, 2001 (JP) ........................... 2001-101606

(51) Int. Cl.[7] ................ B60Q 1/00; G01D 11/28; G01D 5/00
(52) U.S. Cl. ............... 340/438; 340/815.4; 340/461; 116/62.3; 116/286; 116/288; 362/23; 362/27
(58) Field of Search ................ 250/463.1; 116/286, 116/288, 62.1, 300, 301; 362/23, 26–27, 30; 340/438, 425.5, 815.45, 815.78, 815.8

(56) References Cited

U.S. PATENT DOCUMENTS 4,935,850 A * 6/1990 Smith, Jr. ............... 362/27
5,376,917 A * 12/1994 Yoshimoto et al. ......... 340/438
5,949,330 A * 9/1999 Hoffman et al. ........... 340/438
5,949,346 A * 9/1999 Suzuki et al. .......... 340/815.45
6,014,075 A * 1/2000 Fujimori et al. ............. 340/461
6,276,809 B1 * 8/2001 Matsumoto ................. 362/26
6,302,551 B1 * 10/2001 Matumoto ................... 362/27
6,333,697 B1 * 12/2001 Kumazawa et al. ..... 340/815.4
6,461,006 B1 * 10/2002 Matumoto ................... 362/27
6,520,109 B2 * 2/2003 Komura ..................... 116/288

FOREIGN PATENT DOCUMENTS

JP     A-6-201410     9/1997

* cited by examiner

Primary Examiner—Jeffery Hofsass
Assistant Examiner—Anne V. Lai
(74) Attorney, Agent, or Firm—Posz & Bethards, PLC (57) ABSTRACT A graduation board has an arc-shaped graduation portion and translucent graduations disposed along the graduation portion. A light emitting pointer is disposed on a front side of the graduation board and moves along the graduations. A plurality of LEDs that are disposed on a reverse side of the graduation board emits respective graduations. A control circuit controls an emission order of the LEDs according to the movement of the light emitting pointer when a key switch of the vehicle is turned on. As a result, the combination meter provides attractiveness and originality for the driver, when the key switch turns on.

16 Claims, 10 Drawing Sheets

VEHICLE INDICATOR UNIT HAVING WOWING AND GRADUATION LIGHTING FUNCTION

CROSS REFERENCE TO RELATED APPLICATION

This application is based upon and claims the benefit of Japanese Patent Application No. 2001-101606 filed on Mar. 30, 2001, the contents of which are incorporated herein by reference.

FIELD OF THE INVENTION

The present invention relates to an indicator unit of a vehicle instrument panel.

BACKGROUND OF THE INVENTION

JP-A-6-201410 discloses a conventional vehicle indicator unit. In this indicator unit, a graduation board is illuminated after predetermined time has passed after an ignition switch turns on and a pointer begins to emit light.

The indicator unit, however, only delays illuminating the graduation board from the light emission of the pointer that is performed when the ignition switch turns on. Therefore, an appearance of the graduation board is not interesting and lacks originality.

Further, U.S. Pat. No. 6,014,075 (JP-A-9-42996) proposes an indicator unit having wowing function of its pointer. That is, when an ignition switch turns on, the pointer is driven to turn from the zero-position on a graduation board to a maximum-position thereon.

However, if only the wowing action is performed, the appearance of the graduation board is not interesting and lacks originality, too.

SUMMARY OF THE INVENTION

It is therefore an object of the present invention to provide an attractive vehicle indicator unit.

According to the present invention, a graduation board has an arc-shaped graduation portion and translucent graduations disposed along the graduation portion. A pointer is disposed on a front side of the graduation board and moves along the graduations. A plurality of luminous sources that are disposed on a reverse side of the graduation board to light respective graduations. A control unit controls the order of lighting of the luminous sources according to the movement of the pointer when a key switch of the vehicle is operated.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS (First Embodiment)

Figure 1:
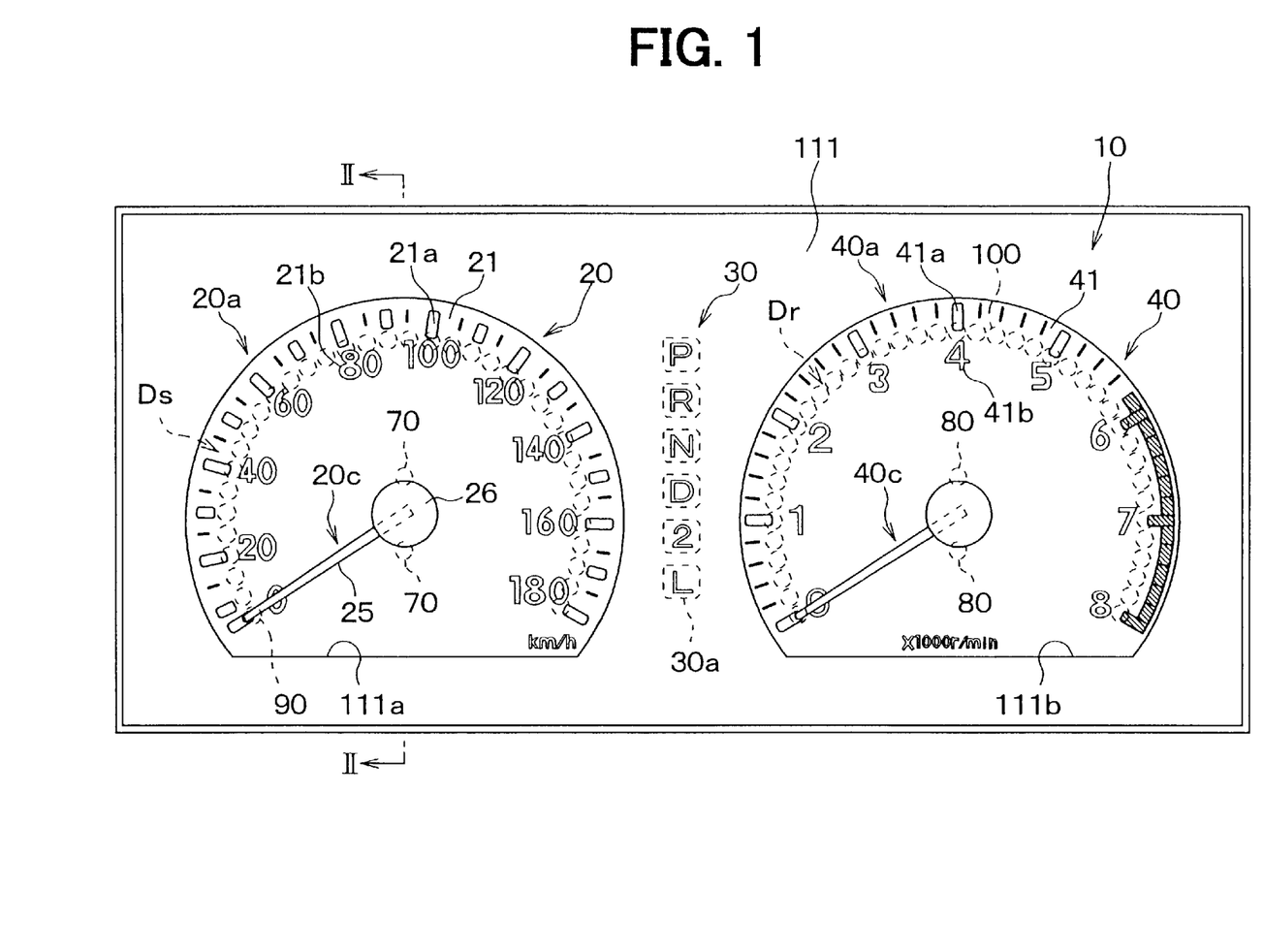
FIG. 1 is a front view showing a combination meter of a vehicle according to a first embodiment of the present invention.

Referring to FIG. 1, a combination meter, which is equipped in an instrument panel of a vehicle (not shown), has an instrument board 10, a speedometer 20, an indicator 30 and a tachometer 40. The speedometer 20, indicator 30 and tachometer 40 are disposed on the instrument board 10.

Figure 2:
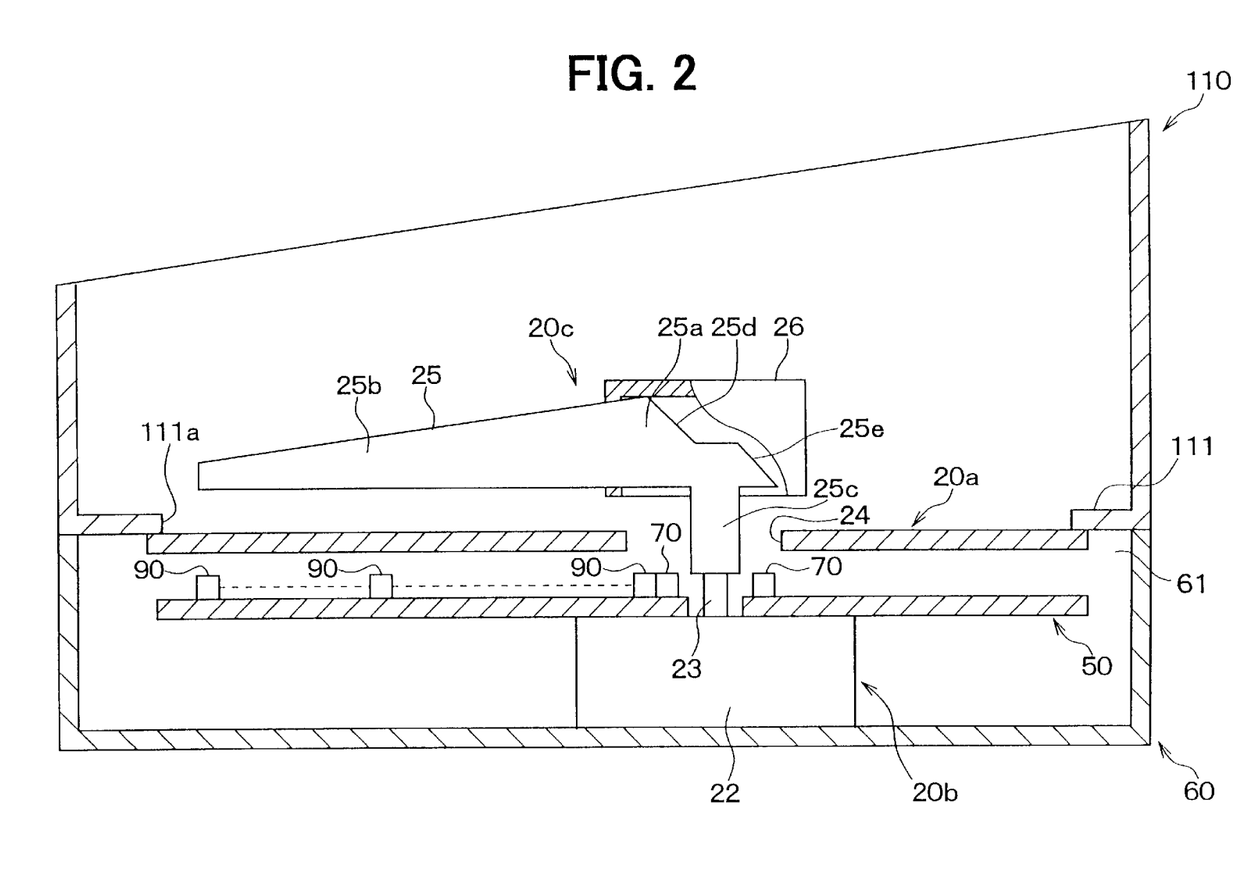
FIG. 2 is a sectional view, taken along line II—II in FIG. 1.

Referring further to FIG. 2, the speedometer 20 includes a graduation board 20a assembled into the instrument board 10 and a motor 20b disposed on the reverse side of the instrument board 10 according to the position of the graduation board 20a. The front surface of the instrument panel 10 is colored black except the position corresponding to the graduation boards 20a, 40a and an indicator 30a.

The graduation board 20a has approximately arc-shaped graduation portion 21 for indicating vehicle speed, which has transparent graduations 21a and numerical characters 21b. The graduation board 20a is opaque except the graduations 21a and the characters 21b.

The motor 20b has a motor body 22 and a rotary shaft 23 that extends toward the front side of the combination meter 10 through a circuit board 50 and a center opening 24 of the graduation board 20a. Further, the speedometer 20 has a light emitting pointer 20c having an elongate pointer body 25 formed by transparent resin and a cap 26 having a U-shape in cross-section formed by opaque resin.

The pointer body 25 has a base portion 25a and a pointer portion 25b that extends from the base portion 25a. The pointer portion 25b is supported on a tip end of the shaft 23 by a boss 25c of the base portion 25b. Therefore, the pointer body 25 is driven by the shaft 23 and moves along the surface of the graduation board 20a.

Further, the pointer body 25 has a plurality of reflection walls 25d, 25e formed by inclined caudal walls of the base portion 25a. The reflection walls 25d, 25e reflect incident light irradiated through the reverse side of the base portion 25a to the pointer portion 25b. The cap 26 is installed at the base portion 25a so as to cover the front and circumferential surface of the base portion 25a.

As with the speedometer 20, the tachometer 40 includes a graduation board 40a, a motor 40b (FIG. 3) and a light emitting pointer 40c. The graduation board 40a has approximately arc-shaped graduation portion 41 for indicating an engine rotation speeds.

The motor 40b is disposed on the reverse side of the instrument board 10 according to the position of the graduation board 40a. The light emitting pointer 40c has a pointer body and a cap respectively corresponding to the pointer body 25 and the cap 26 of the light emitting pointer 20c. A base portion of the light emitting pointer 40c is supported on a tip end of the shaft of the motor 40b, so that the pointer body is driven by the shaft and moves along the surface of the graduation board 40a.

As shown in FIG. 2, the circuit board 50 extends in parallel with the graduation boards 20a, 40a and connects to respective front surfaces of the motors 20b, 40b. The circuit board 50 is supported on a lower side casing 60. The motors 20b, 40b are accommodated in and supported on the lower side casing 60.

A pair of light-emitting diodes (LEDs) 70 for illuminating the pointer 20c are disposed on the circuit board 50 at the same angular interval around the shaft 23 as shown in FIGS. 1 and 2. The LEDs 70 irradiate to the reverse side of the base portion 25a through the center opening 24 of the graduation board 20a. A pair of LEDs 80 for illuminating the pointer 40c are disposed on the circuit board 50 at the same angular interval around the shaft of the motor 40b as shown in FIG. 1. The LEDs 80 irradiate to the reverse side of the base portion of the light emitting pointer 40c through the center opening of the graduation board 40a.

An LED group Ds for illuminating the graduation board 20a includes a plurality of LEDs 90. Respective LEDs 90 are disposed on the circuit board 50, which is arranged on the reverse side of the graduation board 20a, at an angular interval around the shaft 23 of the motor 20b. That is, respective LEDs 90 are arranged from the minimum speed (0 km/h) position of the graduation 21a to the maximum speed (180 km/h) position thereof along the arc-shape of the graduation board 20a. Thus, each of the LEDs 90 irradiates a part of the graduation portion 21, which corresponds to itself.

Moreover, a LED group Dr for illuminating the graduation board 40a includes a plurality of LEDs 100. Respective LEDs 100 are disposed on the circuit board 50, which is arranged on the reverse side of the graduation board 40a, at an equal angular interval around the shaft of the motor 40b. That is, respective LEDs 100 are arranged from the minimum rotation speed (0×1000 r/min) position of the graduation 41a to the maximum rotation speed (8×1000 r/min) position thereof along the arc-shape of the graduation board 40a. Thus, each of the LEDs 100 irradiates a part of the graduation portion of the graduation board 40a, which corresponds to itself.

A cylindrical holding panel 110 is attached on the side of an opening 61 of the casing 60 through the bottom wall 111 thereof. The bottom wall 111 is fixed to the instrument board 10 and has openings 111a, 111b through which the graduation boards 20a, 40a can be recognized.

Figure 3:
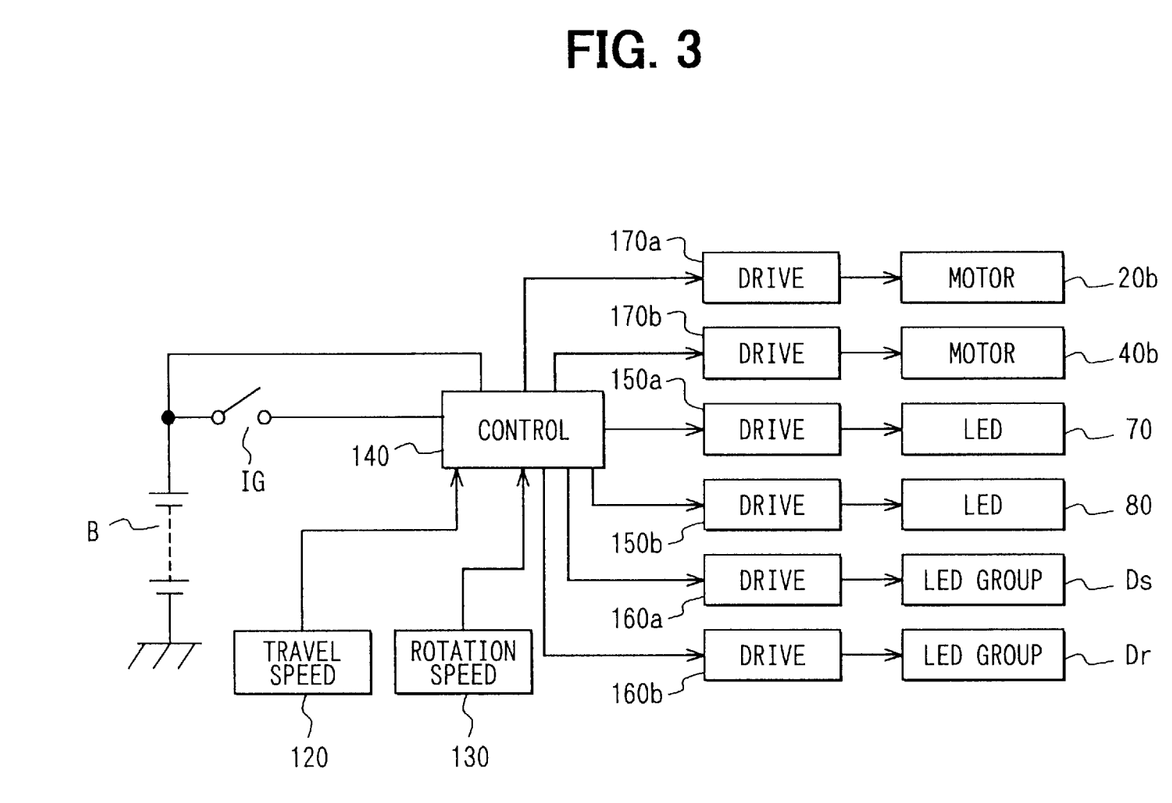
FIG. 3 is a block diagram showing an electric circuit of the combination meter of FIG. 1.
Figure 4:
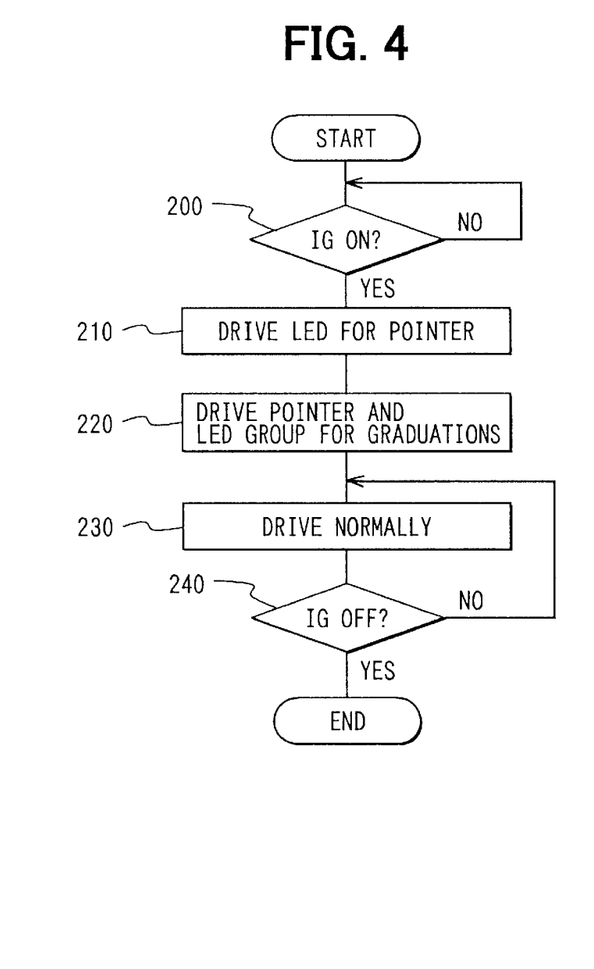
FIG. 4 is a flow diagram showing control steps executed by a microcomputer according to the first embodiment of the present invention.

Next, a construction of an electric circuit of this combination meter is described. As shown in FIG. 3, signals of a vehicle travel speed sensor 120 and an engine rotation speed sensor 130 are input to a control circuit 140 in order to detect the vehicle speed and the rotation speed of the engine. The control circuit 140 is a microcomputer that is programmed to drive the motors 20b, 40b, the LEDs 70, 80, and LED groups Ds, Dr using respective drive circuits 150a–170b. This control circuit 140 operates with a supply of a voltage from the battery B. The program is memorized in a ROM equipped in the control circuit 140, and the control circuit 140 operates as shown in FIG. 4.

At step 200, the condition of a vehicle key switch (ignition switch IG) is determined. If the ignition switch IG is still OFF, this processing is executed repeatedly. On the contrary, if the ignition switch IG is ON, that is, if the ignition switch is turned to the accessory position ACC, the processing advances to step 210 to execute drive processing with regard to the LEDs 70, 80, before the ignition switch IG is further turned to start an engine. This step 200 may be initiated in response to any operation of the ignition switch before engine starting. Thus, drive circuit 150a, 150b make the LEDs 70, 80 emit light. The light of the LEDs 70 irradiates the reverse side of the base portions 25a of the light emitting pointer 20c through the center opening 24. Similarly, the light of the LEDs 80 irradiates the reverse side of the base portions of the light emitting pointer 40c through the center opening of the graduation board 40a.

The incident light in the base portion 25a is reflected to the pointer portion 25b by the reflection walls 25d, 25e. The incident light in the base portion of the light emitting pointer 40c is reflected as the incident light in the base portion 25a. In this manner, both of the light emitting pointers 20c, 40c emit the light.

Then, the processing advances to step 220 to execute wowing action processing and drive processing with regard to the light emitting pointers 20c, 40c and the LED groups Ds, Dr.

First, during the wow action processing of the light emitting pointer 20c, the pointer 20c is driven from the minimum vehicle speed position (original or rest position) to the maximum vehicle speed position on the graduation board 20a and then returned to the minimum vehicle speed position. Hereinafter an angle that is divided equally over a movable range of the light emitting pointer 20c, i.e., the range between the minimum vehicle speed position and the maximum vehicle speed position is referred to as a turn angle. Respective turn angles correspond to respective LEDs 90.

During the wow action processing of the light emitting pointer 40c, the pointer 40c is driven from the minimum rotation speed position to the maximum rotation speed position on the graduation board 40a and then returned to the minimum rotation speed position. Hereinafter an angle that is divided equally over a movable range of the light emitting pointer 40c, i.e., the range between the minimum rotation speed position and the maximum rotation speed position is referred to as a turn angle. Respective turn angles correspond to respective LEDs 100.

Further, emission drive processing of the LEDs 90, which are in the LED group DS, is executed so as to synchronize the wow action of the light emitting pointer 20c. Specifically, respective LEDs 90 emit light in synchronism with the rotation of the light emitting pointer 20c. For example, the LEDs 90 emit light one by one every time when the light emitting pointer 20c moves the turn angle. In this case, a part of the LEDs 90 emits light from the minimum vehicle speed position to the maximum vehicle speed position of the graduation board 20a. Then, a part of the LEDs 90 emits light from maximum vehicle speed position to the minimum vehicle speed position. Therefore, the graduations 21a and characters 21b of the graduations portion 21 give off light according to the movement of the light emitting pointer 20c.

Moreover, emission drive processing of the LEDs 100, which are in the LED group Dr, is executed so as to synchronize the wowing action of the light emitting pointer 40c. Specifically, respective LEDs 100 emit light in synchronism with the rotation of the light emitting pointer 40c. For example, the LEDs 100 emit light one by one every time when the light emitting pointer 40c moves the turn angle. In this case, a part of the LEDs 100 emit light from the minimum rotation speed position to the maximum rotation speed position above the graduation board 40*a*. Then, a part of the LEDs 100 emits light from maximum rotation speed position to the minimum rotation speed position. Therefore, the graduations 41*a* and characters 41*b* of the graduations portion 41 give off light according to the movement of the light emitting pointer 40*c*.

Next, the processing advances to step 230 when the processing of step 220 is completed and the engine or vehicle runs. At step 230, the control circuit 140 transmits vehicle travel speed data based on the output signal of the vehicle travel speed sensor 120 to the drive circuit 170*a*. Moreover, the control circuit 140 transmits engine rotation speed data based on the output signal of the rotation speed sensor 130 to the drive circuit 170*b*.

Therefore, the drive circuit 170*a* drives the motor 20*b* based on the vehicle speed data to move the light emitting pointer 20*c*, so that the speedometer 20 indicates vehicle travel speed. Further, the drive circuit 170*b* drives the motor 40*b* based on the vehicle engine rotation speed data to move the light emitting pointer 40*c*, so that the tachometer 40 indicates engine rotation speed. Further, all of the LEDs 90, 100 emit light.

The processing advances to step 240 to determine whether the ignition switch IG is OFF or not. If the ignition switch IG is OFF, the processing ends. On the contrary, the ignition switch IG is ON, the processing of step 230 is executed repeatedly.

According to this embodiment, in the speedometer, the light emitting pointer 20*c* emits light using the light of the LEDs 70 when the ignition switch IG turns on. Then, the motor 20*b* drives the light emitting pointer 20*c* to perform the wow action. Further, respective LEDs 90 emit light in synchronism with the rotation of the light emitting pointer 20*c*. That is, a part of the graduations 21*a* and characters 21*b* of the graduation portion 21 illuminates according to the turn angle of the light emitting pointer 20*c*.

(Second Embodiment)

Figure 5:
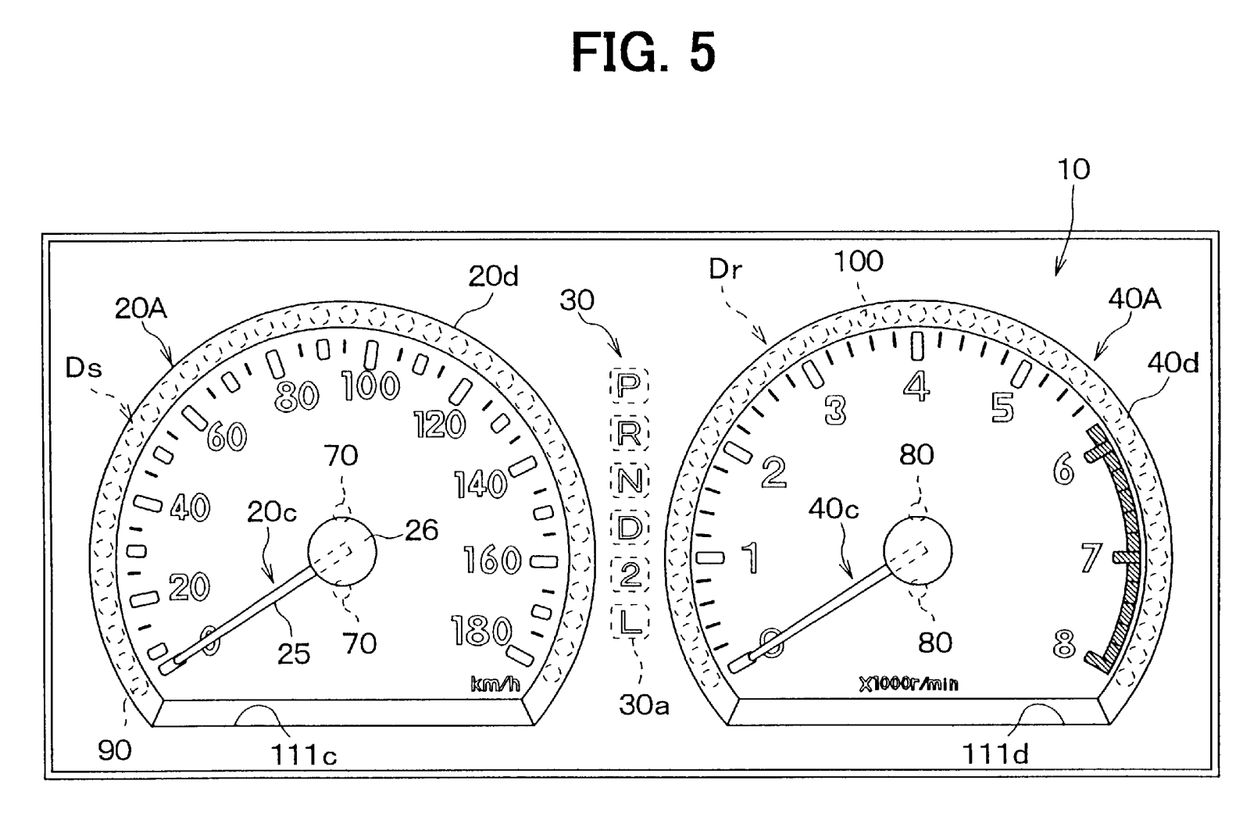
FIG. 5 is a front view showing a combination meter of a vehicle according to a second embodiment of the present invention.

A combination meter of the second embodiment will be described with reference to FIG. 5. In this embodiment, graduation boards 20A, 40A are adopted in place of the graduation boards 20*a*, 40*a* in the first embodiment. The graduation board 20A has a ring-shaped portion 20*d* surrounding the outskirt of the graduation board 20*a*. The ring-shaped portion 20*d* is made of a transparent material. The graduation board 40A has a ring-shaped portion 40*d* surrounding the outskirt of the graduation board 40*a*. The ring-shaped portion 40*d* is made of a transparent material. The bottom wall 111 has openings 111*c*, 111*d* through which the graduation boards 20A, 40A can be recognized. For example, the openings 111*c*, 111*d* are larger than the openings 111*a*, 111*b* of the first embodiment.

Further, respective LEDs 90 of the LED group Ds are disposed on the circuit board 50 so as to be arranged on the reverse side of the ring-shaped portion 20A. Respective LEDs 100 of the LED group Dr are disposed on the circuit board 50 so as to be arranged on the reverse side of the ring-shaped portion 40A.

In the second embodiment, steps 200–220 shown in FIG. 4 are executed as in the first embodiment. For example, the light emitting pointer 20*c* emits light using the light of the LEDs 70 when the ignition switch IG turns on. Next, the motor 20*b* drives the light emitting pointer 20*c* to perform the wow action. Then, respective LEDs 90 emit light in synchronism with the rotation of the light emitting pointer 20*c*.

That is, the LEDs 90 emit light one by one every time when the light emitting pointer 20*c* moves the turn angle. In this case, a part of the LEDs 90 emit light from the minimum vehicle speed position to the maximum vehicle speed position of the graduation board 20A. Then, a part of the LEDs 90 emit light from maximum vehicle speed position to the minimum vehicle speed position. Therefore, the ring-shaped portion 21*d* of the graduation portion 21 gives off light according to the movement of the light emitting pointer 20*c*. The tachometer 40 provides the same advantage for the driver as the speedometer 20.

(Third Embodiment)

A combination meter of the third embodiment will be described with reference to FIGS. 6–11.

Figure 6:
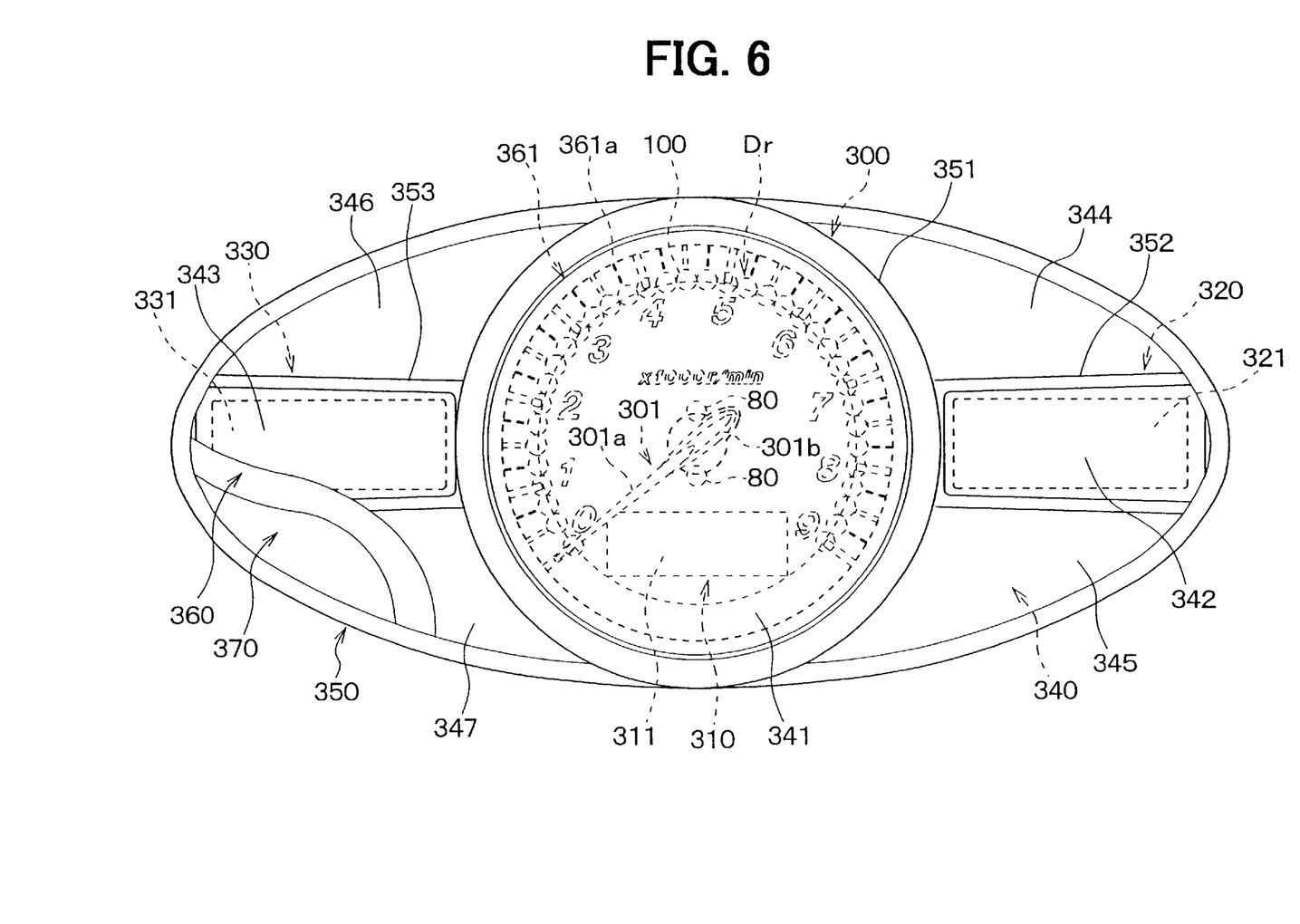
FIG. 6 is a front view showing a combination meter of a vehicle according to a third embodiment of the present invention.

Referring to FIG. 6, the combination meter has a tachometer 300, a speedometer 310, a water temperature and fuel gauge 320, and an odometer 330 that are disposed in the housing constructed by an cylindrical holding panel 350 and casing (not shown) using an instrument board 360 and a circuit board 370.

The instrument board 360 is constructed with a transparent board having printed graduation pattern 361. The rest part of the instrument board 360 except the graduation pattern 361 and liquid crystal panels 310, 341, 342 are printed black as a background. The instrument panel 360 and the circuit board 370 are sandwiched between an opening of the casing and an anchor opening of the cylindrical holding panel 350.

Figure 7:
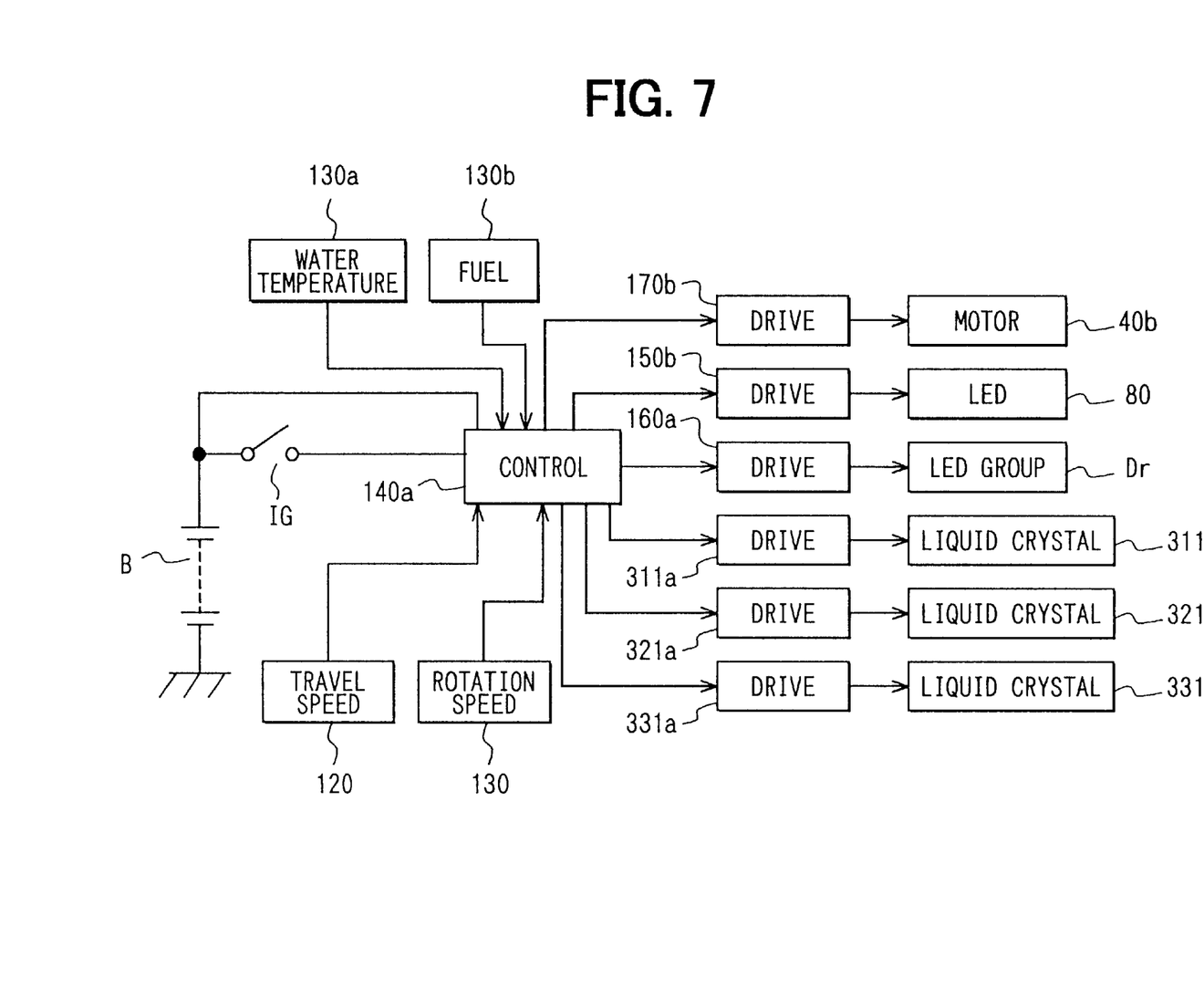
FIG. 7 is a block diagram showing an electric circuit of the combination meter of FIG. 6.

The tachometer 300 has a graduation pattern 361 that is arranged at the center of the instrument board 360 and a light emitting pointer 301 that moves along a surface of the graduation pattern 361 as shown in FIG. 6. Further, the tachometer 300 has the motor 40*b* as shown in FIG. 7. The motor 40*b*, which is accommodated in the casing at the position corresponding to the graduation pattern 361, is used for driving the light emitting pointer 301. The drive circuit 170*b* drives the motor 40*b* to move the light emitting pointer 301 on an arc-shaped graduation portion 361*a* of the graduation pattern 360, so that the tachometer 300 indicates engine rotation speed. The graduation pattern 361*a* is basically the same as the graduation board 41 shown in FIG. 1, and its graduations and characters are transparent. The graduation pattern 361 is in a dark color except the respective graduations and characters thereof and is disposed at center position in order to recognize through a center frame of the cylindrical holding panel 350. The motor 40*b* is supported on the reverse side of the circuit board 370 by a body thereof.

The speedometer 310 has the liquid crystal panel 311 that is arranged at the lower side of the graduation pattern 361 and at the reverse side of the graduation board 360. The liquid crystal panel 311 is a digital display having several figures, e.g. tree figures, seven segments to indicate the vehicle travel speed. The liquid crystal panel 311 displays the vehicle speed using backlight thereof.

The water temperature fuel gauge 320 has a liquid crystal panel 321 arranged at the right side and on the reverse side of the graduation board 360 in order to be recognized through a right side frame 352 of the cylindrical holding panel 350. The liquid crystal panel 321 indicates water temperature of a coolant and remaining amount of fuel using bar graph display.

The odometer 330 has a liquid crystal panel 331 arranged at the left side and on the reverse side of the graduation board 360 in order to be recognized through a left side frame 353 of the cylindrical holding panel 350. The liquid crystal panel 331 is a digital display having several figures seven segment to indicate the mileage.

The front panel 340 is made of resin with 20% light transmission, so that it provides a black face. The front panel 340 is constructed of a plurality of panel portions 341–347. The panel portions 341–343 are respectively inserted in the center, right side or left side frame 351–353 of the cylindrical holding panel 350. The panel portions 344–347 are respectively inserted in the openings except the frames 351–353 of the cylindrical holding panel 350.

Further, in this embodiment, the LEDs 80 are disposed on the circuit board 370 at the same angular interval to face the reverse side of the base portion of the light emitting pointer 301. Therefore, the LEDs 80 irradiate to the reverse side of a base portion of the light emitting pointer 301 through the center opening of the graduation board 360.

The light emitting pointer 301 has a pointer body 301a and a cap 301 for covering the base portion thereof. It is basically the same construction as the light emitting pointer 20c in the first embodiment. In this construction, the incident light in the base portion is reflected to a pointer portion of the pointer body 301a by reflection walls. In this manner, the pointer body 301a emits the light.

The LED group Dr has a plurality of LEDs 100 that are disposed on the circuit board 370, which is arranged on the reverse side of the graduation board 360, at an equal angular interval around the shaft of the tachometer 300. The LEDs 100 are arranged along arc shape as the graduations portion 361a.

Next, a construction of an electric circuit of this combination meter is described. As shown in FIG. 7, there are not only the travel speed sensor 120 and the rotation speed sensor 130 but the water temperature sensor 130a and fuel sensor 130b. The water temperature sensor 130a detects the temperature of the coolant, and the fuel sensor 130b detects the amount of fuel remaining in the fuel tank.

The control circuit 140a is programmed to drive the motor 40b, the LEDs 80, LED group Dr, and liquid crystal panels 311, 321, 331 using respective drive circuits 150b, 160a, 170b, 311a, 321a, 331a. For example, the control circuit 140a executes processing for emitting the LEDs 80 and LED group Dr using the drive circuit 150b, 160a and for driving the motor 40b of the tachometer 300 to indicate the rotation speed using the drive circuit 170b. Further, the control circuit 140a executes processing of the liquid crystal panel 341–343 for displaying the vehicle speed, the mileage, water temperature and fuel amount using the drive circuit 311a, 321a, 321a based on respective sensors 120, 130, 130a, 130b. The other processing are the same as that of the first embodiment.

Figure 8:
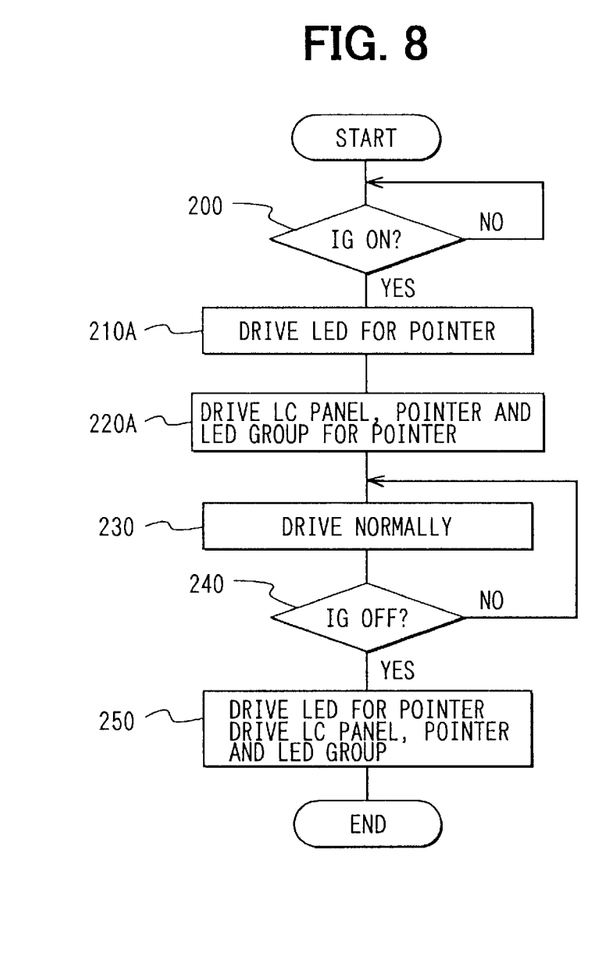
FIG. 8 is a flow diagram showing control steps executed by a microcomputer according to the third embodiment of the present invention.
Figure 9:
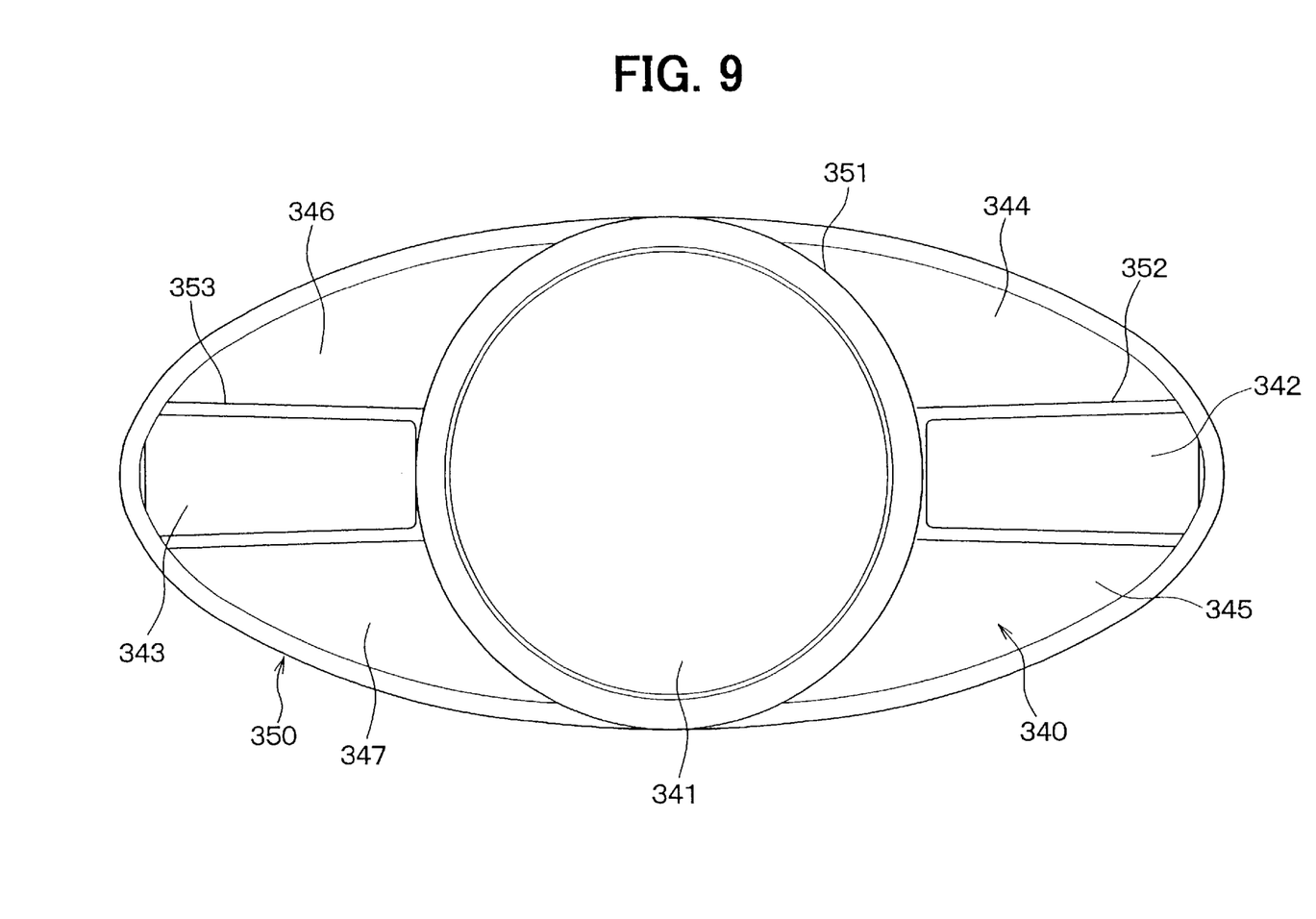
FIG. 9 is a front view showing the indicator unit before an ignition switch turns on in the third embodiment.

At step 200, the condition of an ignition switch IG is determined. If the ignition switch IG is still OFF, this ID processing is executed repeatedly. In this condition, the LEDs 80 and LED group Dr do not emit light, so that the front panel 340 provides the blackface. Therefore, the instrument panel 360 including the graduation pattern 361, the pointer 301, and the liquid crystal panels 311, 321, 331 cannot be recognized as shown in FIG. 9.

On the contrary, if the ignition switch IG is ON, the processing advances to step 210A to execute the drive processing of the LEDs 80. Therefore, the drive circuit 150b drives the LEDs 80. Then, the LEDs 80 irradiate the light through the center opening of the graduation board 360 to the reverse side of the base portion of the light emitting pointer 301. This incident light is reflected by the reflection walls of the pointer body 301a to the pointer portion thereof. In this manner, the light emitting pointer 301 emits light.

Then, the processing advances to step 220A to executes an initial drive processing of the liquid crystal panels 311, 321, 331, a wow action processing of the light emitting pointer 301, and drive processing of the LED group Dr.

During the initial drive processing, the drive circuits 311a, 331a drive the liquid crystal panel 311, 331 to turn on all figures of the seven segments. The drive circuit 331a drives the liquid crystal panel 321 to turn on all bars of the bar graph.

During the wow action processing of the light emitting pointer 301, the pointer 301 is driven from the minimum rotation speed position to the maximum rotation speed position on the graduation pattern 361a and then returned to the minimum rotation speed position. Hereinafter an angle that is divided equally an activate range of the light emitting pointer 301, i.e., the range between the minimum rotation speed position and the maximum rotation speed position is referred as a turn angle. Respective turn angles correspond to respective LEDs 100.

The emission drive processing of the LEDs 100, which is equipped in the LED group Dr, are executed so as to synchronize the wow action of the light emitting pointer 301. Specifically, respective LEDs 100 emit in synchronism with the rotation of the light emitting pointer 301. For example, the LEDs 100 emit light one by one every time when the light emitting pointer 301 moves the turn angle. In this case, a part of the LEDs 100 emit light from the minimum rotation speed position to the maximum rotation speed position above the graduation board 301. Then, a part of the LEDs 100 emits from maximum rotation speed position to the minimum rotation speed position. Therefore, the graduations and characters of the graduation pattern 361a give off light according to the movement of the light emitting pointer 301.

Figure 10:
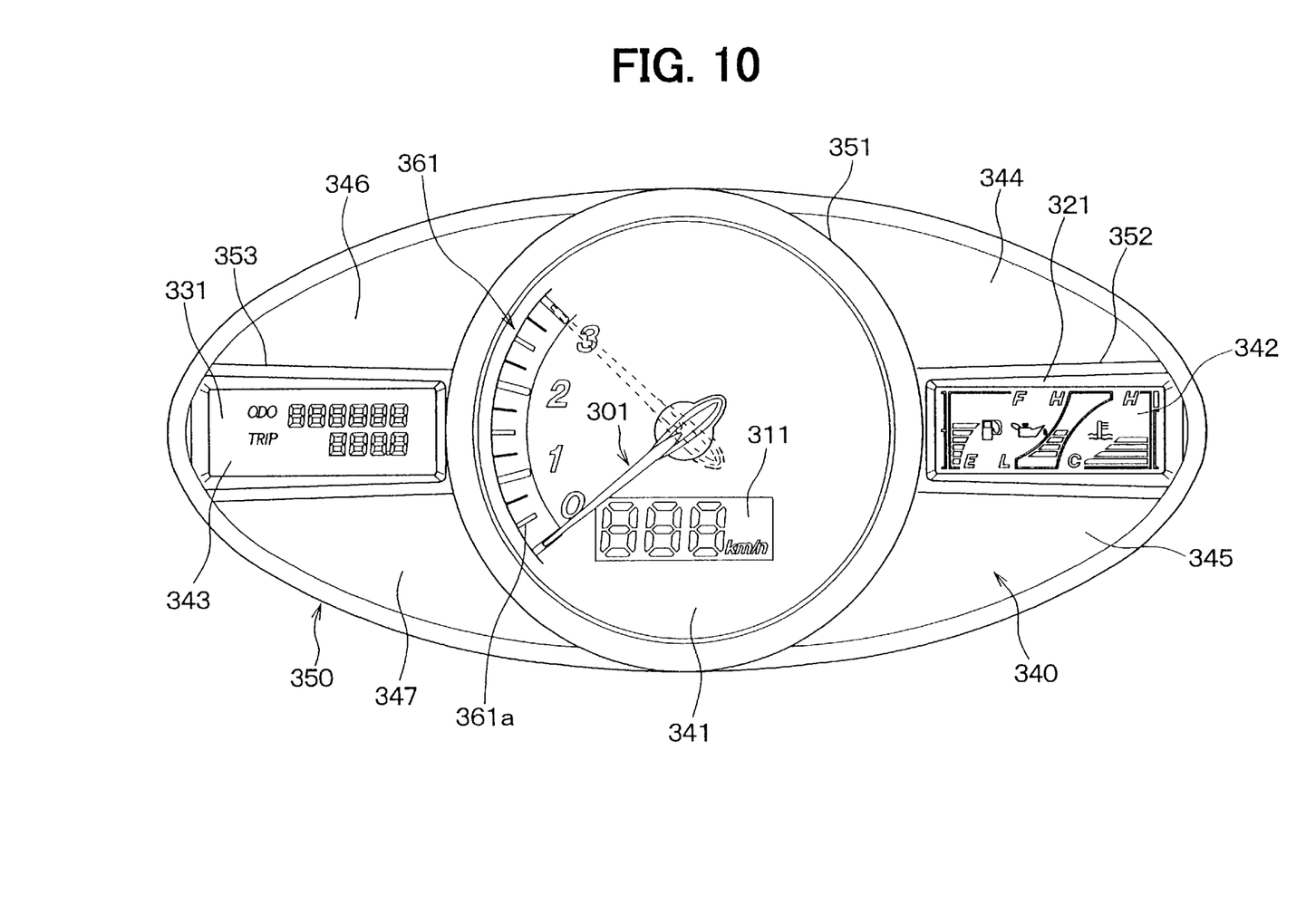
FIG. 10 is a front view showing the indicator unit when the ignition switch turns on in the third embodiment.

An initial display action of the liquid crystal panel 311, 321, 331 and an emission action of the LED group Dr are described with reference to FIG. 10. As shown in FIG. 10, the liquid crystal panels 311, 321, 331 turn on all segments and bars. The light emitting pointer 301 moves to the number "3" position of the graduation pattern 361a. Further, a part of the LEDs 100 corresponding to the movement of the light emitting pointer 301 emits light. Therefore, a part of the graduations and characters of the graduation pattern 361a from minimum rotation speed position to the number "3" position gives off light.

In this manner, the graduation pattern 361a gives off in synchronism with the wow action of the light emitting pointer 301 and the initial display action of the liquid crystal panel 311, 321, 331. Accordingly, the combination meter is able to perform the same advantages as the first embodiment.

The processing advances to step 230 to execute a normal display routine after step 220A. Then, the vehicle travel speed data based on the output of the vehicle travel speed sensor 120 is output to the drive circuit 311a. The vehicle engine rotation speed data based on the output of the rotation sensor 130 is output to the drive circuit 170b. The water temperature and fuel remaining amount data based on the water temperature sensor 130a and fuel sensor 130b are output to the drive circuit 321a. Further, the mileage data based on the vehicle speed sensor 120 is output to the drive circuit 331a.

Therefore, the drive circuit 170b drives the motor 40b based on the vehicle engine rotation data to move the light emitting pointer 301, so that the tachometer 300 indicates engine rotation speed. The drive circuit 311a drives liquid crystal panel 311 based on the vehicle travel speed data, so that the speedometer 310 indicates vehicle travel speed. The drive circuit 321a drives liquid crystal panel 321 based on the water temperature and fuel remaining amount data, so that the water temperature and fuel gauge 320 indicates water temperature and fuel remaining amount. Further, the drive circuit 331a drives the liquid crystal panel 331 based on the mileage data, so that the odometer 330 indicates the mileage.

If the ignition switch IG turns off, step 240 determines YES. Then, final drive processing of respective liquid crystal panels 311, 321, 331 and the LED group Dr and final action processing of the light emitting pointer 301 are executed. Specifically, the processing in the same way as the initial drive processing of respective liquid crystal panel 311, 321, 331 and emission drive processing of the LEDs 100 of the LED group Dr are executed. Further, the light emitting pointer 301 that is emitting light is driven from minimum rotation speed position of the graduation pattern 361a to the maximum rotation speed position thereof.

That is, during the final drive processing of the liquid crystal panel 311, 321, 331, the drive circuit 311a, 331a drive the panel 311, 331 to turn on all segments. The drive circuit 321a drives the panel 321 to turn on all bars.

During the final drive processing of the LED group Dr, the drive circuit 160a turns on the LEDs 100. During the final action processing of the light emitting pointer 301, the motor 40b drives the light emitting pointer 301 from minimum rotation speed position of the graduation pattern 361a to the maximum rotation speed position thereof.

Figure 11:
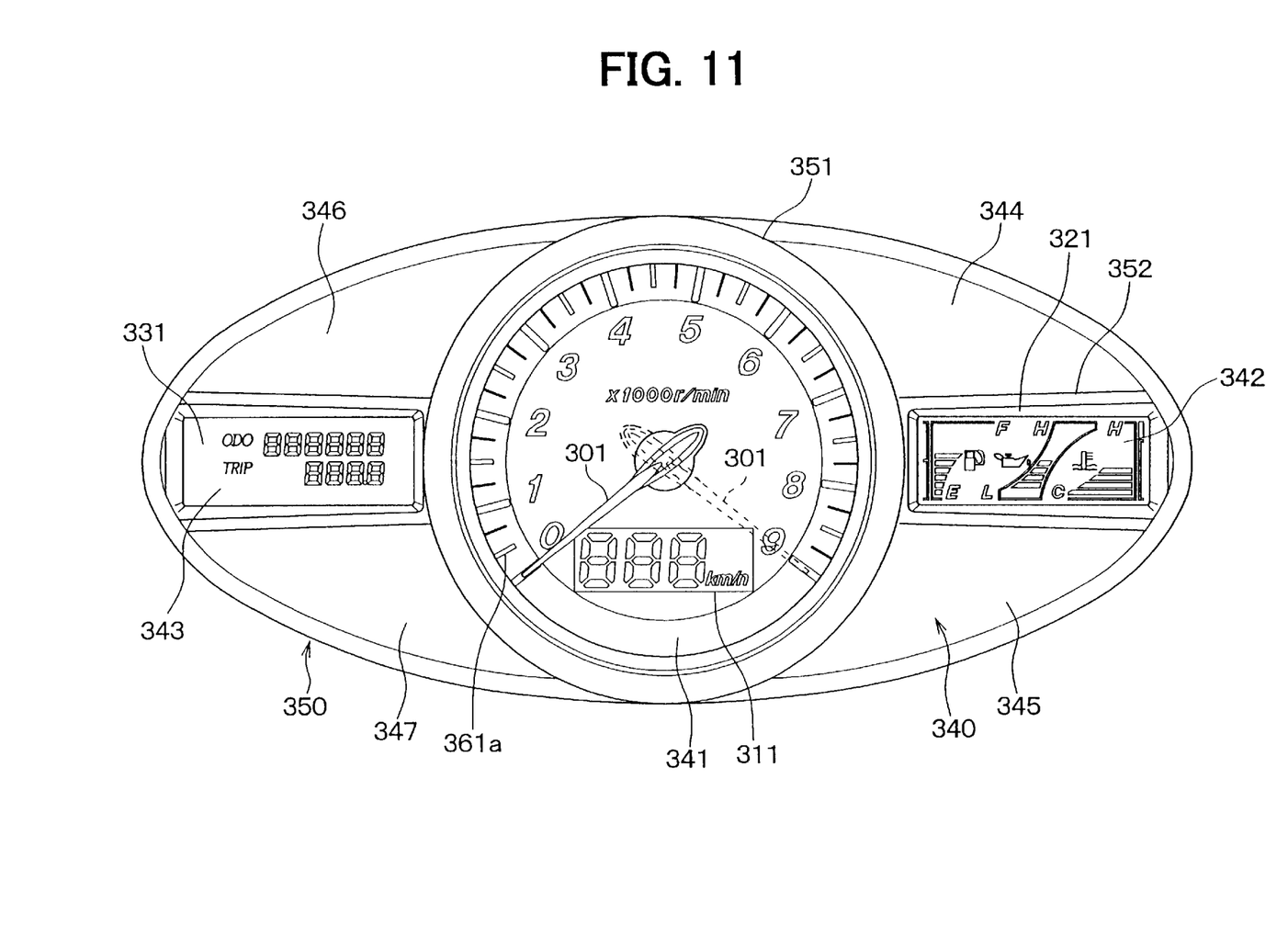
FIG. 11 is a front view showing the indicator unit when the ignition switch turns off in the third embodiment.

The final action of the respective liquid crystal panel 311, 321, 331 and light emitting pointer 301 and an emission outline of the graduation pattern by the emission of the LEDs 100 are described with reference to FIG. 11. As shown in FIG. 11, respective liquid crystal panels 311, 321, 331 display according to the final action processing. The light emitting pointer 301 that is emitting is moved from the maximum rotation speed position of the graduation pattern 361a to the minimum rotation speed position thereof when all graduations and numerical characters of the graduation pattern 361a emits light using the emission of the LEDs 100.

(Modifications)

In the first to third embodiments, normal pointers, i.e., not light emitting pointers, may be adopted in place of respective light emitting pointers 20c, 40c, 301.

In the first and second embodiments, both of the graduations and numerical characters emit light corresponding to the movement of the light emitting pointer 20c. However, if at least one of the graduations and numerical characters emits light, the combination meter can perform the same advantages as the first embodiment. This can be applied to not only the graduation board 20a of the speedometer 20 but also one (40a) of the tachometer 40. Furthermore, this can be also applied to the third embodiment. That is, at least one of graduations and numerical characters of the graduation pattern 361a may emit light.

A delay time, e.g., 1 minute, may be applied between step 210 and step 220. For example, the wow action and emission processing is performed 1 minute later after the emission of the LEDs 70, 80 that is performed when the ignition switch turns on. Moreover, the delay time may be applied between wow action and emission action of the LEDs 90, 100. For example, a part of the LEDs 90, 100 emits light later 1 minute after the wowing action.

In the first to third embodiments, respective LEDs 90, 100 disposed at each position may be constructed with two LEDs that have a LED for emitting the graduation and an LED for illuminating the number. In this case, following processing may be adopted.

For example, first, only one of the LEDs disposed at each position for lighting the graduation or for lighting the numbers are lighted as first processing. This processing is executed 0.5 minute later after the emission of the LEDs 70, 80. Next, the wowing action and emission processing with regard to the other one of the LEDs are performed as second processing. This processing is executed further 0.5 minute later after the first processing.

Further, at step 250 in the third embodiment, first, the LED group Dr is turned off before the final drive processing of respective liquid panels 311, 321, 331 and the LED group Dr and a final action processing of the light emitting pointer 301. Then, the LEDs of the LED group Dr are turned on in synchronism with the movement of the light emitting pointer 301 from the maximum rotation speed position of the graduation pattern 361a to the minimum rotation speed position thereof. In this case, if respective LEDs 100 disposed at each position are constructed two LEDs, at least one of LEDs for lighting the graduations and for emitting the numbers may be turned on according to the movement of the light emitting pointer 301.

The LEDs 90, 100 may emit according to an opposite action from the wow action. Namely, a part of the LEDs 90, 100 emit from the minimum speed (rotation speed) position to the maximum speed (rotation speed) position if the light emitting pointers 20c, 40c, 301 move the maximum speed (rotation speed) position to the minimum speed (rotation speed) position Further, the LEDs 90, 100 may emit intermittently during the wow action.

Moreover, if the engine is started before step 220 or 220A is completed, the processing may advance to the normal processing routine at step 230 without executing step 220 or 220A.

A part of the LEDs 90 corresponding to the number "100" of the characters 21b may emit intermittently to provide warning of high speed of the vehicle. A part of the LEDs 100 corresponding to the number "8" of the characters 41b may emit light intermittently to warn high rotation of the engine. A character "H", "C", or "E" to be displayed in the liquid crystal panel 321 may turn on intermittently to provide warning of high or low temperature of the coolant or insufficiency of the fuel amount.

A lamp or the like are adopted as the luminous source in place of the LEDs 70, 80, 90, 100.

This invention may be adopted in not only the combination meter of the vehicle but also a meter that is not a combination meter. Further, this invention may be adopted in not only the vehicle that has engine but also an electric vehicle.

What is claimed is:

1. A vehicle indicator comprising:

a graduation board having an arc-shaped graduation portion and translucent graduations disposed along the graduation portion;

a pointer that is disposed on a front side of the graduation board and movable through the graduations;

a plurality of luminous sources disposed on a reverse side of the graduation board for lighting respective graduations; and a control unit for controlling lighting of the luminous sources and movement of the pointer:

wherein the control unit controls lighting order of the luminous sources according to the movement of the pointer when a key switch of the vehicle is operated.

2. A vehicle indicator as in claim 1, wherein the control unit controls the lighting order in synchronism with the movement of the pointer.

3. A vehicle indicator as in claim 1, further comprising:

a pointer lighting device for lighting the pointer before the pointer is moved when the key switch of the vehicle is turned on.

4. A vehicle indicator as in claim 1, wherein the graduation portion includes translucent numbers that are disposed in correspondence to the graduations; and the control unit controls the pointer from a minimum number position of the graduations to a maximum number position thereof, and thereafter controls the pointer from the maximum number position to the minimum number position.

5. A vehicle indicator as in claim 1, wherein the control unit controls the luminous sources to light from a minimum number position of the graduations to a maximum number position thereof.

6. A vehicle indicator comprising:

a graduation board having an arc-shaped graduation portion and translucent graduations disposed along the graduation portion;

a pointer that is disposed on a front side of the graduation board and movable through the graduations;

a plurality of luminous sources disposed on a reverse side of the graduation board for lighting respective graduations; and a control unit for controlling lighting of the luminous sources and movement of the pointer:

wherein the control unit controls a lighting order of the luminous sources according to the movement of the pointer when a key switch of the vehicle is operated, and wherein the control unit controls the lighting order of the luminous sources when the key switch of the vehicle is turned off.

7. A vehicle indicator as in claim 1, further comprising:

a pointer lighting device for lighting the pointer; and a black face for covering the light emitting pointer and the graduation board.

8. A vehicle indicator as in claim 1, further comprising:

a liquid crystal panel with a plurality of segments, which indicates information regarding the vehicle, wherein the control unit controls the liquid crystal panel to take off the all segments when the key switch of the vehicle is turned on.

9. A vehicle indicator comprising:

a graduation board having an arc-shaped graduation portion and translucent graduations disposed along the graduation portion;

a pointer that is disposed on a front side of the graduation board and movable through the graduations;

a plurality of luminous sources disposed on a reverse side of the graduation board for lighting respective graduations; and a control unit for controlling lighting of the luminous sources and movement of the pointer:

wherein the control unit controls a lighting order of at least some of the luminous sources according to movement of the pointer when a key switch of the vehicle is operated, and wherein the control unit controls a lighting order of other ones of the luminous sources after a predetermined delay time.

10. A vehicle indicator as in claim 9, wherein the control unit controls the lighting order in synchronism with the movement of the pointer.

11. A vehicle indicator as in claim 9, further comprising:

a pointer lighting device for lighting the pointer before the pointer is moved when the key switch of the vehicle is turned on.

12. A vehicle indicator as in claim 9, wherein the graduation portion includes translucent numbers that are disposed in correspondence to the graduations; and the control unit controls the pointer from a minimum number position of the graduations to a maximum number position thereof, and thereafter controls the pointer from the maximum number position to the minimum number position.

13. A vehicle indicator as in claim 9, wherein the control unit controls the luminous sources to light from a minimum number position of the graduations to a maximum number position thereof.

14. A vehicle indicator as in claim 9, wherein the control unit controls the lighting order of the luminous sources when the key switch of the vehicle is turned off.

15. A vehicle indicator as in claim 9, further comprising:

a pointer lighting device for lighting the pointer; and a black face for covering the light emitting pointer and the graduation board.

16. A vehicle indicator as in claim 9, further comprising:

a liquid crystal panel with a plurality of segments for indicating vehicle information, wherein the control unit controls the liquid crystal panel to take off all of the plurality of segments when the key switch of the vehicle is turned on.

* * * * *